(12) United States Patent
Nishikawa

(10) Patent No.: US 7,301,714 B2
(45) Date of Patent: Nov. 27, 2007

(54) METHOD AND APPARATUS FOR MAGNETIC TRANSFER, AND MAGNETIC RECORDING MEDIUM

(75) Inventor: Masakazu Nishikawa, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 100 days.

(21) Appl. No.: 11/087,669

(22) Filed: Mar. 24, 2005

(65) Prior Publication Data
US 2005/0213372 A1 Sep. 29, 2005

(30) Foreign Application Priority Data
Mar. 24, 2004 (JP) ............................. 2004-086623

(51) Int. Cl.
*G11B 5/86* (2006.01)
(52) U.S. Cl. ..................................... 360/17
(58) Field of Classification Search ............... None
See application file for complete search history.

(56) References Cited

U.S. PATENT DOCUMENTS 6,347,016 B1 * 2/2002 Ishida et al. ................. 360/17
2002/0044368 A1 4/2002 Yoshizawa
2004/0027708 A1 * 2/2004 Suzuki et al. ................. 360/17

FOREIGN PATENT DOCUMENTS

| JP | 10-40544 A | 2/1998 |
| JP | 10-269566 A | 10/1998 |
| JP | 2002-42301 A | 2/2002 |

* cited by examiner

*Primary Examiner*—William R. Korzuch
*Assistant Examiner*—Daniell L. Negrón
(74) *Attorney, Agent, or Firm*—Sughrue Mion, PLLC

(57) ABSTRACT

A magnetic pattern, in which errors due to sub-pulses do not occur during signal reproduction, is transferred from a magnetic transfer master carrier. A magnetic field is applied to a conjoined body, formed by the master carrier bearing a transfer pattern corresponding to desired information and a discoid transfer medium. A magnetic transfer apparatus that includes magnetic field applying means having magnetic poles that extend from the interior to the outer periphery of the conjoined body, and rotating means for relatively rotating the conjoined body with respect to the magnetic poles is employed. The magnetic poles are provided such that a distance d, between end surfaces of the magnetic poles and the conjoined body decrease from the interior to the outer periphery of the conjoined body. Magnetic transfer is performed employing the magnetic field, the intensity of which increases from the interior to the outer periphery of the transfer medium.

4 Claims, 4 Drawing Sheets

METHOD AND APPARATUS FOR MAGNETIC TRANSFER, AND MAGNETIC RECORDING MEDIUM

BACKGROUND OF THE INVENTION

1. Field of the Invention

The present invention relates to a method and apparatus for magnetic transfer, for transferring a desired magnetic pattern from a magnetic transfer master carrier to a transfer medium. The present invention also relates to a magnetic recording medium.

2. Description of the Related Art

Conventionally, magnetic transfer methods that transfer magnetic patterns corresponding to information from a master carrier to a transfer medium (slave medium) are known. Magnetic transfer is performed by placing the master carrier bearing the magnetic pattern in close contact with the slave medium, which has a magnetic recording layer. Then, a transfer magnetic field is applied to the master carrier and the slave medium while they are in a state of close contact, to transfer and record the magnetic pattern onto the slave medium. Magnetic transfer is advantageous in that it enables static recording of information without changing the relative positions of the master carrier and the slave medium, and also capable of recording in an extremely short period of time (refer to Japanese Unexamined Patent Publication Nos. 10(1998)-040544 and 10(1998)-269566).

It has already been proposed in Japanese Unexamined Patent Publication Nos. 10(1998)-040544 and 10(1998)-269566 to record servo signals, for positioning heads, onto magnetic recording media by magnetic transfer.

Meanwhile, there is a technical problem associated with magnetic transfer. That is, during transfer of signals from the master carrier to the slave medium, unclear (inversely magnetized) magnetic recording portions are generated. Sub-pulses are detected within readout waveforms of the magnetic pattern due to the presence of these unclear magnetic recording portions. The sub-pulses may be recognized as reproduction signals by a magnetic reproduction apparatus, causing errors in readout. Methods for observing the sub-pulses, which are generated due to the presence of the unclear magnetic recording portions, are disclosed in U.S. patent application Publication No. 20020044368 and Japanese Unexamined Patent Publication No 2002-042301.

The present inventors have performed research, and found that sub-pulses do not occur at portions of the uneven magnetic pattern, which is provided on the master carrier, at which protrusions are densely formed. On the other hand, sub-pulses occurred with high frequency at portions of the pattern at which protrusions are sparsely formed.

SUMMARY OF THE INVENTION

The present invention has been developed in view of the foregoing circumstances. It is an object of the present invention to provide a method and apparatus for magnetic transfer that transfer magnetic patterns that do not generate false recognition of sub-pulses during signal reproduction, onto transfer media.

It is another object of the present invention to provide a transfer medium, onto which a magnetic pattern has been transferred by the magnetic transfer method of the present invention.

As a result of simulations and factor analysis by the present inventors, it was found that at portions of master carriers at which protrusion patterns are dense, adjacent protrusions sequentially absorb and discharge magnetic flux. Therefore, magnetic flux sufficient to invert the magnetization of slave media can be generated at these portions, even if transfer magnetic field intensities are low. However, at portions at which protrusion patterns are sparse, transfer media do not sufficiently absorb magnetic flux discharged by the protrusion patterns of master carriers. Therefore, unclear magnetized regions are generated on the transfer media, and sub-pulses are generated in reproduction waveforms. It was also found that sub-pulses occur conspicuously at the outer peripheral portions than at the inner portions. This is attributed to the fact that distances are greater between densely packed patterns to isolated signals at the outer peripheral portions, compared to the inner portions. Specifically, in a 3.5 inch disk, the bit length is 100 nm per bit at the innermost track while 400 nm at the outermost track.

The basic cause of sub-pulse generation is insufficient magnetic flux along the pattern. Therefore, the transfer accuracy at the sparse portions of the pattern was improved by increasing the intensity of the applied magnetic field. The generation of sub-pulses was greatly suppressed at the outer peripheral portions, where the pattern is sparse, by increasing the intensity of the applied magnetic field. However, signal dropouts occurred at the inner portions.

The cause of the signal dropouts at the inner portions was found to be insufficient S/N ratios at the dense portions of the pattern. Conventionally, applied magnetic fields are of uniform intensity from the inner to the outer periphery. By increasing the magnetic field intensity in order to improve transfer accuracy at the outer peripheral portion, the magnetic field which should be converged within the protrusion patterns at the inner portions, where the protrusion patterns are densely provided, leaked. Thereby, unclearly magnetized regions were generated, decreasing contrast of signals, which are thought to cause the signal dropouts.

The present invention has been developed based on the above knowledge.

The magnetic transfer method of the present invention comprises the steps of:

placing a master carrier for magnetic transfer, bearing a transfer pattern corresponding to desired information thereon, and a discoid transfer medium in close contact; and applying a magnetic field to the conjoined body formed by the master carrier and the transfer medium, to transfer the transfer pattern onto a magnetic recording surface of the transfer medium; wherein:

the applied magnetic field is of a greater intensity at the outer periphery than at the inner portion of the transfer medium.

The applied magnetic field is only required to be greater in intensity at the outer peripheral portion than at the inner portion of the transfer media. The present invention is not limited to cases in which the intensity of the applied magnetic field increases continuously (monotonously) from the inner portion to the outer periphery. Increases and decreases in the intensity of the applied magnetic field may be imparted at portions of the inner portion and at portions of the outer periphery. However, it is desirable that the intensity of the applied magnetic field increases continuously from the inner portion to the outer periphery of the discoid transfer medium. It is particularly desirable that the intensity of the applied magnetic field is minimal at the innermost track of the transfer medium and maximal at the outermost track thereof.

Note that it is desirable that:

a magnetic field intensity Hin[A/m], of the magnetic field which is applied to the innermost track of the transfer medium, is within a range of Hc±39.8 kA/m, wherein Hc is the magnetic coercive force of the transfer medium. At this time, it is desirable that:

a magnetic field intensity Hout, of the magnetic field which is applied to the outermost track of the transfer medium, a difference r between a radius $r_{in}$ of the innermost track and a radius $r_{out}$ of the outermost track, and the magnetic field intensity Hin[A/m] of the magnetic field which is applied to the innermost track, satisfy the relationship:

$$H_{out}=H_{in}+\alpha/r(7.96\times10^3\leq\alpha\leq3184\times10^3).$$

Note that the above equation, when expressed in cgs units, becomes:

$$H_{out}=H_{in}+\alpha'/r[Oe](100\leq\alpha'\leq40,000).$$

Here, 1Oe=79.6 A/m.

It is desirable that the applied magnetic field is a DC magnetic field.

The magnetic transfer apparatus of the present invention comprises:

magnetic field applying means for applying a magnetic field to a conjoined body, which is formed by a master carrier for magnetic transfer bearing a transfer pattern corresponding to desired information thereon and a discoid transfer medium, having magnetic poles that extend from the inner portion to the outer periphery of the transfer medium, the end surfaces of the magnetic poles being provided so as to face the conjoined body; and rotating means for rotating the conjoined body relative to the magnetic poles, wherein:

the distance between the end surfaces of the magnetic poles and the conjoined body is smaller at the outer periphery of the conjoined body than at its inner portion.

The magnetic recording medium of the present invention is that on which a magnetic pattern based on a transfer pattern of a master carrier is recorded by the magnetic transfer method of the present invention.

According to the magnetic transfer method of the present invention, the intensity of the applied magnetic field is greater at the outer periphery of the transfer medium compared to that at the inner portion thereof. Therefore, a magnetic field having sufficient intensity is applied at the outer peripheral portion, where protrusion patterns are sparse, while leakage of the magnetic field at the inner portion, where protrusion patterns are dense, is suppressed. Accordingly, favorable magnetic transfer is enabled across the entire surface of the transfer medium. Thereby, the magnetic pattern, which has been magnetically transferred onto the transfer medium, can be read out with a favorable S/N ratio.

DESCRIPTION OF THE PREFERRED EMBODIMENTS

Hereinafter, an embodiment of the present invention will be described with reference to the attached drawings.

Figure 1:
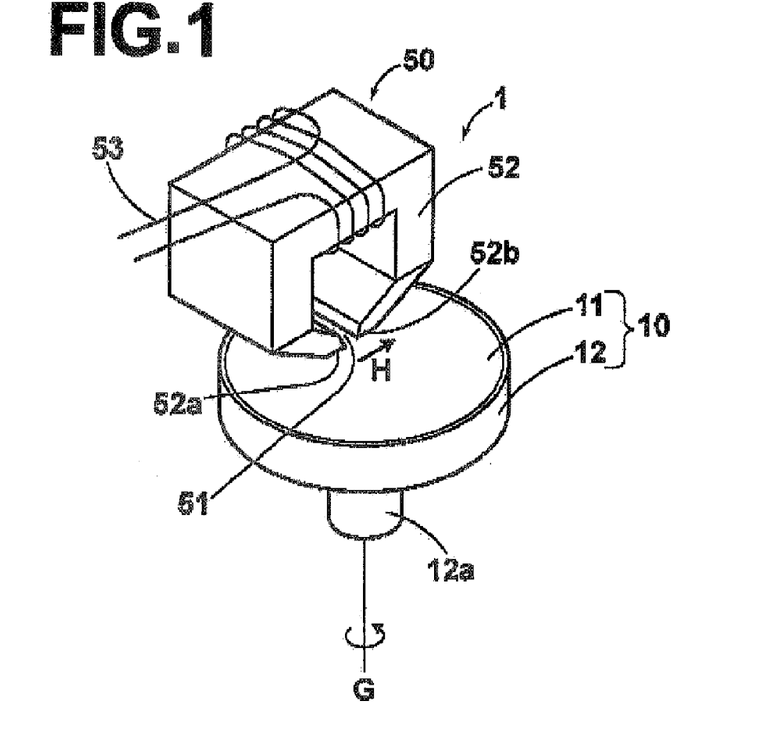
FIG. 1 is a perspective view illustrating the schematic construction of a magnetic transfer apparatus according to an embodiment of the present invention.
Figure 2:
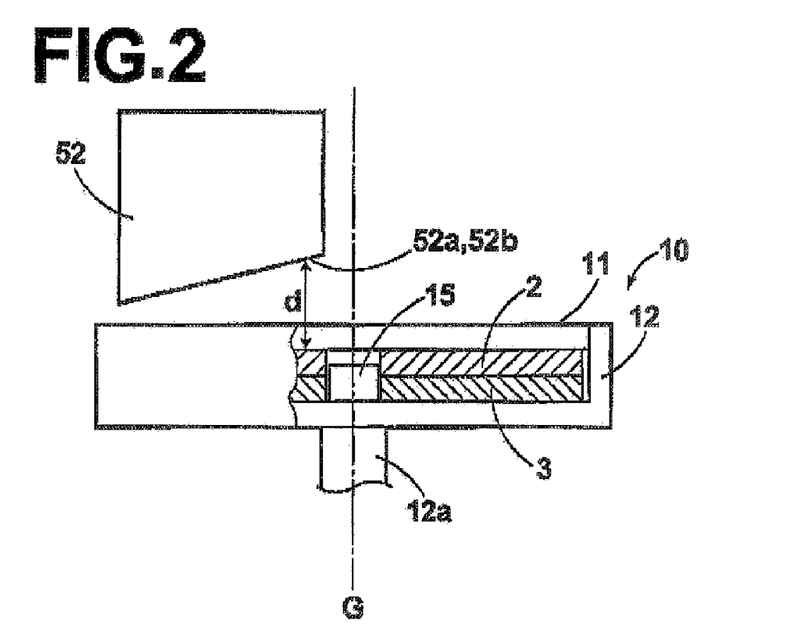
FIG. 2 is a side view of the magnetic transfer apparatus of FIG. 1.
Figure 3:
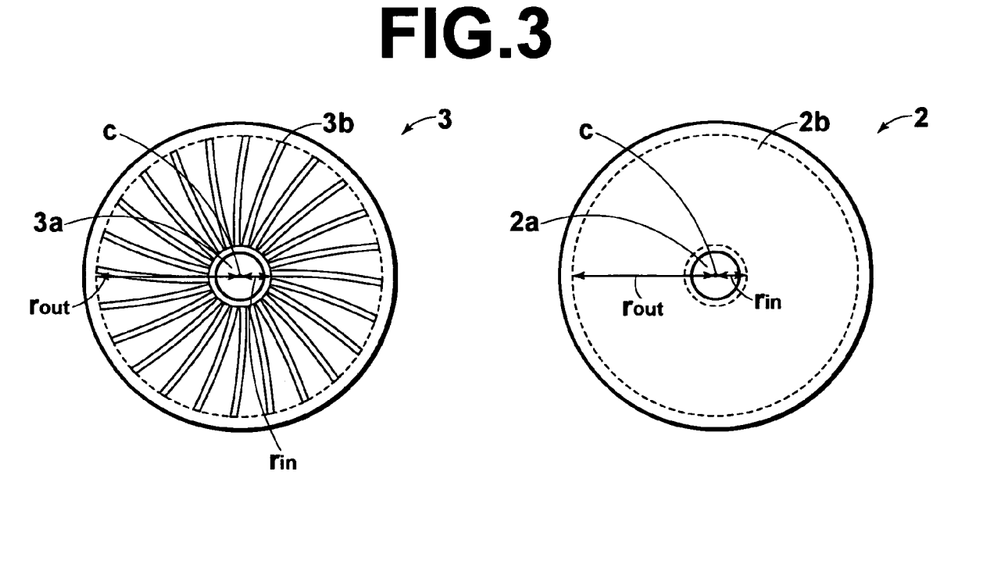
FIG. 3 is a plan view that illustrates a magnetic transfer master carrier and a slave medium.

FIG. 1 is a perspective view illustrating the schematic construction of a magnetic transfer apparatus 1 according to an embodiment of the present invention. FIG. 2 is a side view of the magnetic transfer apparatus 1 of FIG. 1. FIG. 3 is a plan view that illustrates a magnetic transfer master carrier 3 and a slave medium 2, which is a transfer medium.

As illustrated in FIG. 1 and FIG. 2, the magnetic transfer apparatus 1 comprises: a transfer holder 10; and a magnetic field applying means. The transfer holder 10 serves as a holding means for holding a conjoined body, constituted by the master carrier 3, which has a transfer pattern 3b that corresponds to desired information on the surface thereof, and the slave medium 2, which has a magnetic recording surface 2b, placed in close contact with each other. The magnetic field applying means comprises an electromagnet 50 for applying a magnetic field to the master carrier 3 and the slave medium 2, which are in close contact with each other.

The magnetic transfer apparatus 1 applies a transfer magnetic field to the conjoined body in a direction tangential to the tracks thereof. In this state, the conjoined body is caused to rotate relative to the electromagnet 50 about the center of the transfer pattern 3b (transfer center C). Thereby, a magnetic pattern corresponding to the transfer pattern 3b is magnetically transferred onto the magnetic recording surface 2b. The electromagnet 50 comprises a core 52 having a gap 51 that extends in the radial direction of the transfer holder 10. A coil 53 is wound about the core 52. The electromagnet 50 generates a magnetic field H within the gap 51 between magnetic pole ends 52a and 52b along a direction tangential to the tracks (substantially the track direction). Note that permanent magnets may be employed for the magnetic field applying means, instead of an electromagnet. The magnetic field applying means may also be provided on both sides of the transfer holder 10.

The surfaces of the magnetic pole ends 52a and 52b are constructed such that the distance d between the surfaces and the conjoined body decreases from the inner portion to the outer periphery thereof during magnetic transfer, as illustrated in FIG. 2. Thereby, the intensity of the applied transfer magnetic field increases from the inner portion to the outer periphery of the slave medium 2.

The electromagnet 50 is provided close to the transfer holder 10 during application of the transfer magnetic field to the slave medium 2 and the master carrier, which are in close contact with each other within the transfer holder 10. However, the electromagnet 50 is moved to a standby position during setting of the master carrier 3 and the slave medium 2 within the transfer holder 10, and during taking out of the master carrier 3 and the slave medium from the transfer holder. This is in order to enable opening and closing operations of a first holder 11 and a second holder 12, which will be described later.

The transfer holder 10 comprises the first holder 11 and the second holder 12, which are configured to be able to move relatively toward and away form each other. The slave medium 2 and the master carrier 3 are housed within an interior space formed between the first holder 11 and the second holder 12. The slave medium 2 and the master carrier 3 are stacked on each other with their center positions aligned, and placed into close contact by evacuating the interior space. More specifically, the interior space of the transfer holder 10 is evacuating to a predetermined degree of vacuum during close contact. Thereby, close contacting force between the slave medium 2 and the master carrier 3 is obtained, while the close contact properties are improved by removing air from the close contact surfaces. During atmospheric release and separation of the slave medium 2 and the master carrier 3, evacuating air is introduced in so the interior space. Mechanical force may be applied in addition to the vacuum suction, in order to apply the close contacting force.

A support shaft 12a is provided at the center of the rear surface of the second holder 12. During magnetic transfer, the transfer holder 10 is rotated about a central axis G.

A positioning portion 15 is provided at the center of the inner surface of the second holder 12. The positioning portion 15 engages with a central aperture 3a of the master carrier 3 and a central aperture 2a of the slave medium 2. The positioning portion 15 enables stacking of the master carrier 3 and the slave medium 2 with their centers aligned.

As illustrated in FIG. 3, the master carrier 3 is discoid, has the central aperture 3a at the center thereof, and has the transfer pattern 3b formed along concentric tracks thereof. Note that the master carrier 3 is formed such that the center of the central aperture 3a and the center C of the transfer pattern 3b are matched. In the present embodiment, a plurality of servo regions are provided for each track from a radius $r_{in}$ of the innermost track to a radius $r_{out}$ of the outermost track, so that the plurality of servo regions are radially formed as a whole. A fine uneven pattern (of protrusions and recesses) corresponding to servo signals are formed along the tracks within servo region for each track (refer to FIG. 5). The transfer pattern in the present embodiment corresponds to servo signals. However, the information borne by the master carrier in the form of the transfer pattern is not limited to servo signals. Alternatively, other data signals may be included in the transfer pattern.

Figure 5A:
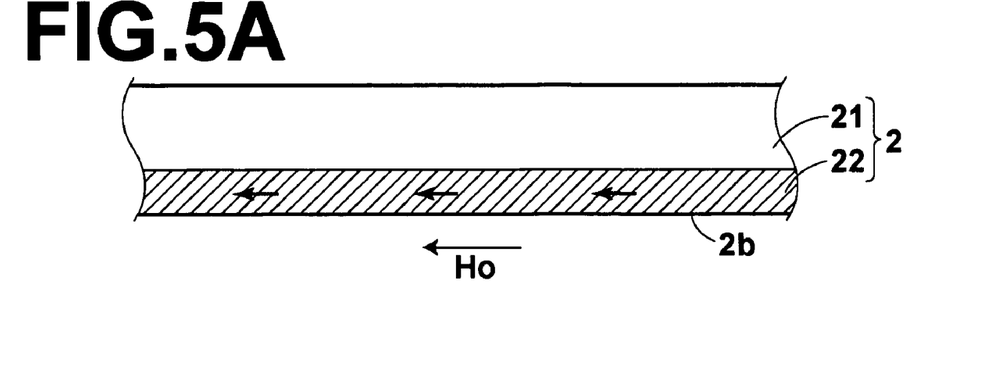
FIGS. 5A, 5B and 5C illustrate the basic steps of magnetic transfer onto a planar magnetic recording medium.
Figure 5B:
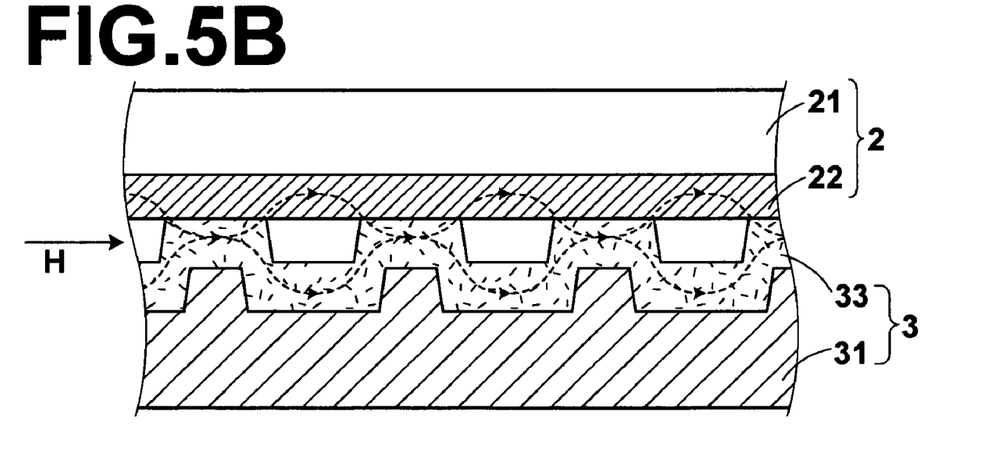
Figure 5C:
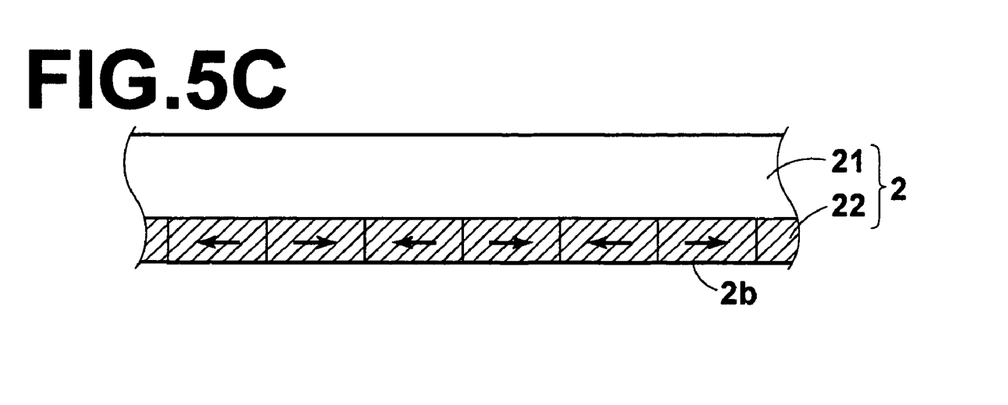

The master carrier 3 basically comprises: a substrate 31 having the uneven pattern on its surface; and a ferromagnetic layer 33 provided on at least the upper surfaces of the protrusions on the substrate 31 (refer to FIG. 5).

The substrate 31 may be formed of a nonmagnetic material. However, it is preferable that the material of the substrate 31 is ferromagnetic. Of ferromagnetic materials, Ni or alloys having Ni as a primary component are particularly preferable. The substrate 31 having the uneven pattern on the surface may be produced by a stamper method, a photolithography method, or the like. The lengths of the protrusion portions of the uneven pattern in the radial direction are 50 nm~5 μm, and the lengths in the circumferential direction are 50 nm~5 μm.

Materials having high saturation magnetization are preferred as the magnetic material of the ferromagnetic layer 33. Examples of such materials are: Co, Co alloys (CoNi, CoNiZr, CoNbTaZr, etc.), Fe, Fe alloys (FeCo, FeCoNi, FeNiMo, FeAlSi, FeAl, FeTaN, etc.), Ni, and Ni alloys (NiFe). FeCo and FeCoNi are particularly preferred. Magnetic layers having low magnetic coercive force, such as soft magnetic or semi-hard magnetic materials, are mainly employed for the ferromagnetic layer.

Note that it is preferable that a hard protective layer having carbon as its primary component is provided on the ferromagnetic layer 33 in order to improve the durability thereof. The protective layer may be a diamond-like-carbon (DLC) layer, or a carbon layer formed by sputtering.

The slave medium is 2 is a discoid magnetic recording medium having the central aperture 2a. The magnetic recording surface 2b is provided on at least one side of the slave medium 2, and a region between a radius $r_{in}$ the innermost track and a radius $r_{out}$ of the outermost track is a recording region. In actuality, the information, such as servo signals, borne by the transfer pattern of the master carrier, is transferred and recorded onto the magnetic recording surface 2b. A region corresponding to the transfer pattern becomes the usable recording region. That is, the recording region matches the region of the transfer pattern 3b of the master carrier 3, which is placed in close contact with the slave medium 2. Note that the slave medium 2 comprises the magnetic recording layer 22, which is provided on one or both sides of a discoid substrate 21, which is hard or flexible (refer to FIG. 5). In the case that the slave medium is a magnetic recording medium having a metallic thin film magnetic recording layer, Co, Co alloys (CoPtCr, CoCr, CoPtCrTa, CoPtCrNbTa, CoCrB, CoNi, Co/Pd, etc.), Fe, or Fe alloys (FeCo, FePt, FeCoNi) may be employed as the magnetic material. The thickness of the magnetic layer is preferably 10 to 500 nm, and more preferably 20 to 200 nm.

It is preferable that a nonmagnetic backing layer is provided under the magnetic layer (on the side of the substrate) to provide magnetic anisotropy, which is necessary for the magnetic layer. Cr, CrTi, CoCr, CrTa, CrMo, NiAl, Ru, Pd, or the like may be employed as the backing layer. However, it is necessary to select a backing layer, of which the crystal structure and the lattice constant match those of the magnetic layer provided thereon. The thickness of the backing layer is preferably 10 to 150 nm, and more preferably 20 to 80 nm.

Next, the operation of the magnetic transfer apparatus of the present embodiment will be described.

The central aperture 3a of the master carrier 3 is engaged with the positioning portion 15 of the first holder 11 with the transfer holder 10 in an open state, in which the first holder 11 and the second holder 12 are separated. Then, the central aperture 2a of the slave medium 2, which has been initially magnetized in the circumferential direction in advance, is engaged with the positioning portion 15 of the first holder 11. Next, the second holder 12 is caused to move toward the first holder 11, to cause the transfer holder 10 to be in a closed state. The interior space of the transfer holder 10, in which the slave medium 2 and the master carrier 3 are housed, in depressurized by vacuum suction. Thereby a close contacting force is uniformly applied to the slave medium 2 and the master carrier 3, to place them in close contact with each other. External mechanical force may be applied to the transfer holder 10 in addition to the vacuum suction, in order to apply the close contacting force.

Thereafter, the electromagnet 50 is caused to approach both sides of the transfer holder 10. The transfer holder 10 is rotated while the electromagnet 50 applies a transfer magnetic field H in a direction substantially opposite from that of the initial magnetization. Thereby, a magnetic pattern corresponding to the transfer pattern borne by the master carrier 3 is transferred and recorded onto the magnetic recording layer of the slave medium 2.

As illustrated in FIG. 2, the end surfaces of the magnetic pole ends 52a and 52b are provided such that the distance d between the end surfaces and the conjoined body decrease from the inner portion to the outer periphery thereof.

Thereby, the intensity of the applied transfer magnetic field increases from the inner portion to the outer periphery of the conjoined body.

Note that a magnetic field intensity Hin, of the magnetic field which is applied to the innermost track of the slave medium, is within a range of Hc±39.8 kA/m, wherein Hc is the magnetic coercive force of the transfer medium. A magnetic field intensity Hout, of the magnetic field which is applied to the outermost track of the transfer medium; a difference r between the radius $r_{in}$ of the innermost track and the radius $r_{out}$ of the outermost track; and the magnetic field intensity Hin of the magnetic field which is applied to the innermost track, satisfy the relationship:

$$H_{out}=H_{in}+\alpha/r(7.96\times10^3 \leq \alpha \leq 3184\times10^3).$$

Figure 4:
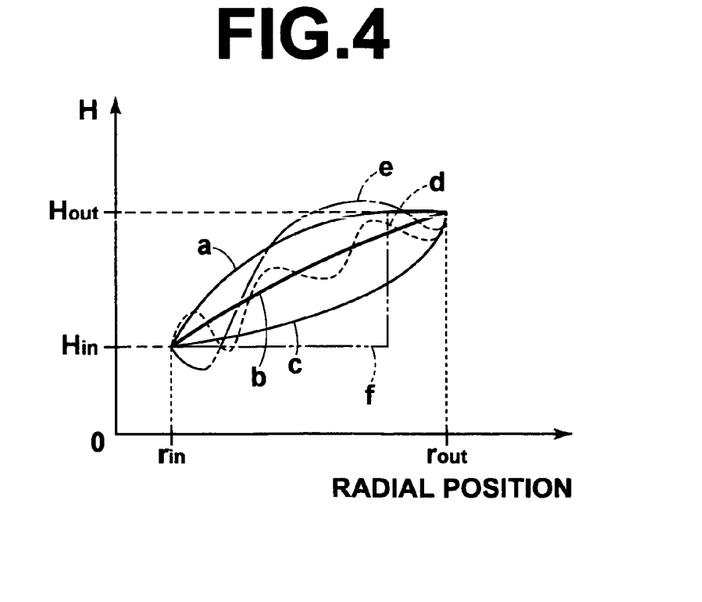
FIG. 4 is a graph that illustrates the magnetic field intensities of the applied magnetic field H at each position along the radial direction of the slave medium.

FIG. 4 is a graph that illustrates the magnetic field intensities of the applied magnetic field H at each position along the radial direction. It is desirable that the magnetic field H is such that the magnetic field intensity $H_{in}$, applied at the innermost track diameter $r_{in}$, is minimal and the magnetic field intensity $r_{out}$, applied at the outermost track diameter $r_{out}$, is maximal, with a gradual increase therebetween, as illustrated by the solid lines a, b, and c of FIG. 4. However, as long as the magnetic field intensity $H_{out}$, applied at the outermost track diameter $r_{out}$, is greater than the magnetic field intensity $H_{in}$, applied at the innermost track diameter $r_{in}$, as illustrated by the broken lines d, e, and f of FIG. 4, the increase in the radial region therebetween need not be monotonous.

Next, the basic principles of magnetic transfer will be described. FIGS. 5A, 5B, and 5C are diagrams for explaining the basic steps of magnetic transfer to a planar magnetic recording medium. FIGS. 5A, 5B, and 5C are sectional views taken perpendicular to the magnetic recording surface and parallel to the track direction. FIG. 5A illustrates a step in which the slave medium is initially magnetized by unidirectionally applying a DC magnetic field thereto. FIG. 5B illustrates a step in which a magnetic field is applied in substantially the opposite direction from that of the DC initial magnetic field while the master carrier and the slave medium are in close contact with each other. FIG. 5C illustrates the state of the magnetic recording surface of the slave medium following magnetic transfer.

First, as illustrated in FIG. 5A, the slave medium 2 is initially magnetized in advance, by applying a DC initial magnetic field $H_o$ in one track direction. Then, as illustrated in FIG. 5B, the recording surface 2b of the slave medium 2 is brought into close contact with the transfer pattern surface of the master medium 3, and a transfer magnetic field H is applied in the direction opposite to that of the initial DC magnetic field $H_o$. As described above, the transfer magnetic field H is that of which the intensity is greater at the outer peripheral portion of the slave medium 2 than at the inner portion thereof. At the locations where the slave medium 2 and the transfer pattern of the master carrier 3 are in close contact, the transfer magnetic field H is absorbed by the protrusion portions of the master carrier 3. The magnetization of the slave medium 2 at the positions corresponding to the protrusions of the master carrier 3 is not inverted, whereas the magnetization at other positions is inverted. As a result, as shown if FIG. 5C, information (for example, servo signals) corresponding to the pattern of protrusions and recesses of the master carrier 3 is magnetically transferred and recorded onto the magnetic recording layer 22 on the recording surface 2b of the slave medium. Here, a case has been described in which the slave medium 2 has the magnetic recording surface 2b on a single side thereof, and magnetic transfer is performed onto the recording surface 2b with the master carrier 3. However, the magnetic recording medium 2 may be provided with magnetic recording surfaces on both sides thereof. In this case, each recording surface is placed in close contact with a master carrier for that surface, either one at a time or simultaneously, and magnetic transfer is performed in a similar manner.

Next, evaluations of examples of the magnetic transfer method according to the present invention, as well as those of comparative examples, will be described.

First, master carriers and magnetic recording media (slave media), which were utilized in transfer apparatuses of the present invention and of the comparative examples, will be described.

The master carriers were those that comprise a discoid Ni substrate, formed by a stamper method.

Figure 6A:
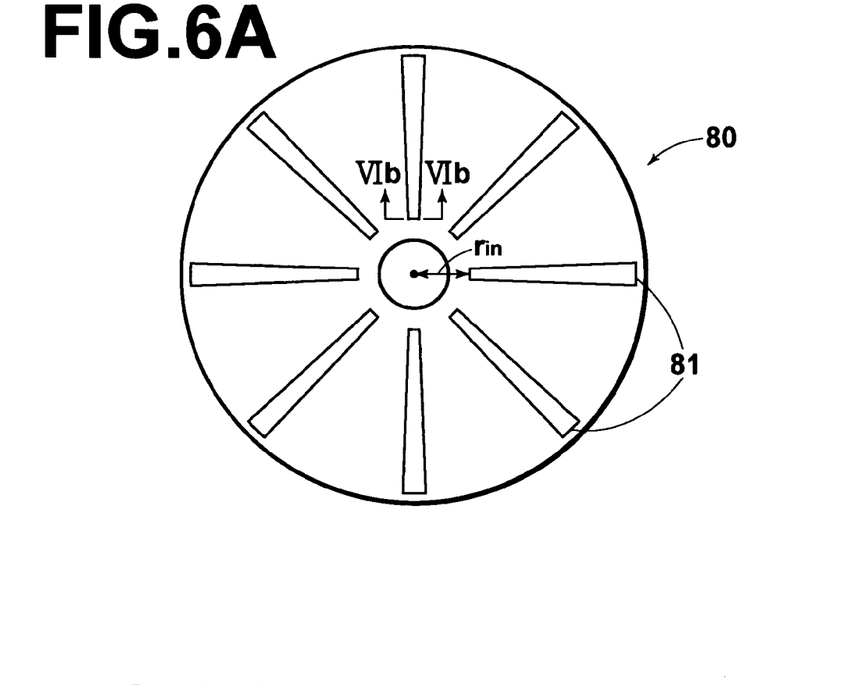
FIG. 6A is a plan view of the master carrier substrate which was employed in the examples of the present invention.
Figure 6B:
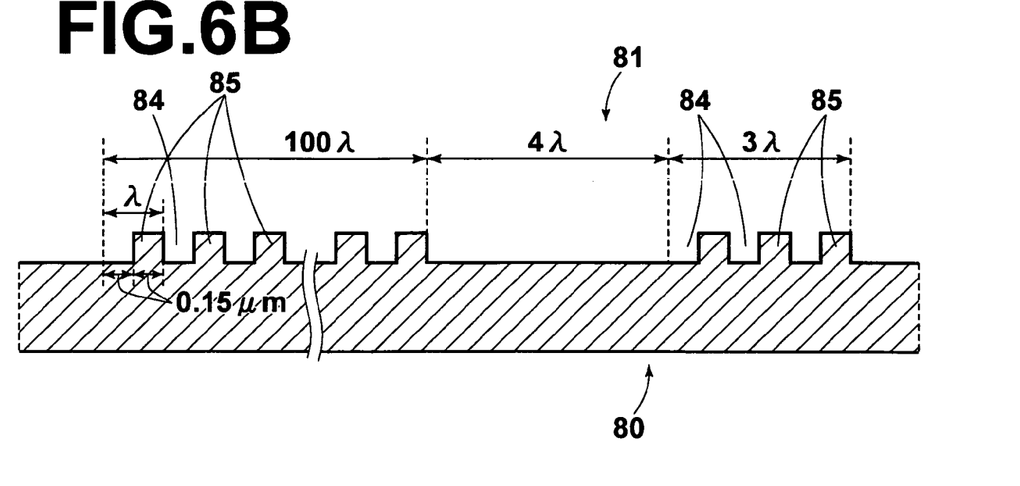
FIG. 6B is a sectional view taken along line 6B-6B of FIG. 6A.

A chemical sensitizing resist was coated at a thickness of 100 nm on an 8 inch Si wafer. Radial lines, having track widths of 1.0 μm, track pitches of 1.1 μm, depths of 0.1 μm, and bit lengths of 0.15 μm at a radial position 10 mm from the rotational center, were drawn by an electron beam within a radial region at radial positions 10 mm to 40 mm from the rotational center. The radial lines were drawn every 45 degrees, 100 wavelengths+no signal for 4 wavelengths+ signals for 3 wavelengths. By developing the resist, a pattern of protrusions and recesses is formed. Then, a Ni conductive layer was formed at a thickness of 10 nm on the resist pattern by sputtering, with the substrate temperature at 40° C. The sputtering conditions at this time were: Ar sputtering pressure of 0.15 Pa (1.08 mTorr); and input power of 2.80 W/cm². Ni electroforming was performed after forming the Ni conductive layer. Electro forming was performed until the thickness of the Ni became 0.3 mm. Thereafter, the Ni substrate was separated from the resist, and the surface of the Ni substrate was cleaned. The Ni substrate has an inner diameter of 12.55 mmφ, and an outer diameter of 83 mmφ. FIG. 6A is a plan view of the master carrier substrate which was employed in the examples of the present invention. FIG. 6B is a sectional view taken along line 6B-6B of FIG. 6A, and illustrates a sectional surface along the track direction at a radial position $r_{in}$=10 mm, of the innermost track. An uneven pattern of protrusions and recesses having a bit length of 0.15 μm at a radial position of 10 mm is formed on the NI substrate at eight radial regions 81, provided every 45 degrees, as illustrated in FIG. 6A. In the uneven pattern, two bits are designated as one wavelength λ. As illustrated in FIG. 6B, the uneven pattern comprises a 10 λ pattern of alternating 1 bit recesses 84 and 1 bit protrusions 85, followed by a 4 λ (8 bit) recess, and a 3 λ pattern of alternating 1 bit recesses 84 and 1 bit protrusions 85, within a single track of a single region 81 of the uneven pattern. Note that the length of single bits increases along with the radius of the position at which the single bits are located.

Thereafter, a ferromagnetic layer (FeCo25 at %) having a thickness of 100 nm was formed on the Ni substrate by sputtering. The sputtering was performed with an initial vacuum of $1.33\times10^{-5}$ Pa ($1.0\times10^{-7}$ Torr), a substrate temperature of 25° C., and input power of 3.20 W/cm².

The slave medium was formed by: depressurizing the interior of a vacuum vapor deposition apparatus (S-SOS Sputtering Apparatus, Shibaura Mechatronics) to $1.33\times10^{-5}$ Pa ($1.0\times10^{-7}$ Torr); introducing argon to cause the pressure to be 0.4 Pa (3.0 mTorr); heating a glass plate to 200° C.; then sputtering CrTi at a thickness of 30 nm and CoCrPt at a thickness of 30 nm onto the glass plate. Thereby, a 3.5 inch discoid planar magnetic recording medium having a saturation magnetization of 2.8T (2250 Gauss) and a magnetic coercive force Hc of 318 kA/m (4000oe) is obtained.

Example 1: The transfer magnetic field was set to be 278.6 kA/m (35000 e) at the innermost track, and 358.2 kA/m (4500oe) at the outermost track. The value of α, in an equation:

$$Hout = Hin + \alpha/r (7.96 \times 10^3 \leq \alpha \leq 3184 \times 10^3)$$

that illustrates the relationship among the magnetic field intensity Hout, which is applied at the outermost track; the difference $r = r_{out} - r_{in}$, between the innermost track radius $r_{in}$ and the outermost track radius $r_{out}$; and the magnetic field intensity Hin, which is applied at the innermost track, was set to $2388 \times 10^3$ ($\alpha' = 30{,}000$).

Example 2: The transfer magnetic field was set to be 278.6 kA/m (3500 oe) at the innermost track, and 318.4 kA/m (4000 oe) at the outermost track. The value of α was set to $1194 \times 10^3$ ($\alpha' = 150{,}000$).

Example 3: The transfer magnetic field was set to be 278.6 kA/m (3500oe) at the innermost track, and 278.8 kA/m (3503oe) at the outermost track. The value of a was set to $7.164 \times 10^3$ ($\alpha' = 90$).

Example 4: The transfer magnetic field was set to be 318.4 kA/m (4000oe) at the innermost track, and 390.0 kA/m (4900oe) at the outermost track. The value of α was set to $4537 \times 10^3$ ($\alpha' = 57{,}000$).

Example 5: The transfer magnetic field was set to be 318.4 kA/m (4000oe) at the innermost track, and 398.0 kA/m (5000oe) at the outermost track. The value of α was set to $2388 \times 10^3$ ($\alpha' = 30{,}000$).

Comparative Example 1: The transfer magnetic field was set to be 278.6 kA/m (3500oe) at the innermost track, and 278.6 kA/m (3500oe) at the outermost track. That is, the magnetic field intensities at the innermost track position and the outermost track position were made equal.

Comparative Example 2: The transfer magnetic field was set to be 318.4 kA/m (4000oe) at the innermost track, and 278.6 kA/m (3500oe) at the outermost track. That is, the magnetic field intensity at the innermost track position was made greater than that at the outermost track position.

Magnetic transfer was performed onto slave media by each of the methods described above. The quality of the transferred signals was measured and evaluated for each of the slave media.

<Evaluation of Signals Recorded onto Slave Media>

Each of the slave media, on which magnetic patterns of a master carrier have been recorded by each of the above magnetic transfer methods, was set in a electromagnetic conversion property management apparatus (SS-60, by Kyodo Denshi). The apparatus was set such that the linear speed of a head (a GMR head having a reproduction head gap of 0.105 μm, a reproduction track width of 0.35 μm, a recording head gap of 0.15 μm, and a recording track width of 0.51 μm) at a radial position 40 mm from the center of the media was 10 m/sec.

The average outputs of 100 wavelength signal portions and 3 wavelength signal portions, eight of which are provided in one rotation of the innermost track and the outermost track, were calculated. Sub-pulses are considered to be generated similarly before and after 100 wavelength signal portions and 3 wavelength signal portions. Sub-pulses affect outputs of 3 wavelength signal portions more than outputs of 100 wavelength signal portions. Therefore, the average outputs of 100 wavelength signal portions were designated as OT100, and the average outputs of 3 wavelength signal portions were designated as OT3. The quality of signals recorded on slave media were evaluated as "good" if OT3/OT100 was greater than 0.95, "fair" if OT3/OT100 was within a range of 0.80 to 0.95, and poor if OT3/OT100 was less than 0.80.

The measurement and evaluation results of each example and each comparative example are illustrated in Table 1 below.

TABLE 1

| | Magnetic Field Intensity at Innermost Track (kA/m) | | Magnetic Field Intensity at Outermost Track (kA/m) | α × 10³ | Signal Quality at Innermost Track | | Signal Quality at Outermost Track | |
|---|---|---|---|---|---|---|---|---|
| | | | | | OT3/OT100 | Evaluation | OT3/OT100 | Evaluation |
| Example 1 | 278.6 | < | 358.2 | 2388 | 0.98 | Good | 0.98 | Good |
| Example 2 | 278.6 | < | 318.4 | 1194 | 0.99 | Good | 0.99 | Good |
| Example 3 | 278.6 | < | 281.0 | 72 | 0.96 | Good | 0.93 | Fair |
| Example 4 | 278.6 | < | 390.0 | 4537 | 0.96 | Good | 0.94 | Fair |
| Example 5 | 318.4 | < | 398.0 | 2388 | 0.98 | Good | 0.97 | Good |
| Comparative Example 1 | 278.6 | = | 278.6 | N/A | 0.98 | Good | 0.74 | Poor |
| Comparative Example 2 | 318.4 | > | 278.6 | N/A | 0.99 | Good | 0.69 | Poor |

As indicated in Table 1, Examples 1 through 5 according to the present invention all were evaluated "fair" or better. Meanwhile, the Comparative Examples 1 and 2 were evaluated has having "poor" signal quality at the outermost track.

Note that the present invention is not limited to the above Examples. Various changes and modifications maybe adopted, as long as they do not depart from the spirit and scope of the invention hereinafter claimed.

What is claimed is:

1. A magnetic transfer method, comprising the steps of:
    placing a master carrier for magnetic transfer, bearing a transfer pattern corresponding to desired information thereon, and a discoid transfer medium in close contact to form a conjoined body; and applying a magnetic field to the conjoined body formed by the master carrier and the transfer medium, to transfer the transfer pattern onto a magnetic recording surface of the transfer medium;

wherein: the applied magnetic field is of a greater intensity at an outer periphery than at an inner portion of the transfer medium, wherein: a magnetic field intensity Hin, of the magnetic field which is applied to an innermost track of the transfer medium, is within a range of Hc±39.8 kA/m, wherein Hc is the magnetic coercive force of the transfer medium, and wherein: a magnetic field intensity Hout, of the magnetic field which is applied to the outermost track of the transfer medium, a difference r between a radius $r_{in}$ of the innermost track and a radius $r_{out}$ of the outermost track, and the magnetic field intensity Hin of the magnetic field which is applied to the innermost track, satisfy the relationship:

$$H_{out}=H_{in}+\alpha/r(7.96\times10^3\leq\alpha\leq3184\times10^3).$$

2. A magnetic transfer method as defined in claim 1, wherein:

the applied magnetic field is a DC magnetic field.

3. A magnetic recording medium, on which a magnetic pattern is recorded by:

placing a master carrier for magnetic transfer, bearing a transfer pattern corresponding to desired information thereon, and a discoid transfer medium in close contact to form a conjoined body; and applying a magnetic field to the conjoined body formed by the master carrier and the transfer medium, to transfer the transfer pattern onto a magnetic recording surface of the transfer medium;

wherein: the applied magnetic field is of a greater intensity at an outer periphery than at an inner portion of the transfer medium, wherein: a magnetic field intensity Hin, of the magnetic field which is applied to an innermost track of the transfer medium, is within a range of Hc±39.8 kA/m, wherein Hc is the magnetic coercive force of the transfer medium, and wherein: a magnetic field intensity Hout, of the magnetic field which is applied to the outermost track of the transfer medium, a difference r between a radius $r_{in}$ of the innermost track and a radius $r_{out}$ of the outermost track, and the magnetic field intensity Hin of the magnetic field which is applied to the innermost track, satisfy the relationship:

$$H_{out}=H_{in}+\alpha/r(7.96\times10^3\leq\alpha\leq3184\times10^3).$$

4. A magnetic recording medium as defined in claim 3, wherein:

the applied magnetic field is a DC magnetic field.

* * * * *